3,189,555
PROCESS FOR PREPARING URANOUS OXIDE SOLS

Jean G. Smith and Frederick T. Fitch, Baltimore, Md., assignors to W. R. Grace & Co., a corporation of Connecticut
No Drawing. Filed Feb. 28, 1962, Ser. No. 176,878
4 Claims. (Cl. 252—301.1)

This invention relates to stable uranous oxide sols and the method for preparing them. In one specific aspect, it relates to an uranous oxide sol which can be used in the preparation of ceramic materials containing uranium and in the preparation of fuels for aqueous homogeneous reactors.

Urania sols are an important technical advance. One of the better known uses is in the field of fuel preparation for aqueous homogeneous reactors. In addition, these materials are of prime interest in preparation of ceramic fuel elements.

The system beryllia and urania ($UO_2$) has a high importance in the construction of nuclear reactors. Beryllium oxide is a very stable compound with respect to radiation influences. At the same time, it acts as a neutron moderator and reflector, not adsorbing free neutrons produced in nuclear reactions. With uranium oxide the beryllia forms a simple eutectic with a melting temperature close to 2100° C. This allows the reactor to operate at very high temperatures.

Sols provide an excellent vehicle for dispersion. The particles are small and can be homogeneously dispersed in a matrix. For example, uranous oxide sols can be dispersed in powder, dried and fired to make a ceramic nuclear fuel of high mechanical strength.

Alternatively, the colloidal uranous oxide particles may be separated from the dispersion medium and used in powder form. Separation may be accomplished by such methods as vacuum evaporation, centrifugation, extraction, et cetera. The resulting uranous oxide particles may then be compacted by pressing into pellets and sintering or they may be mixed with another finely-divided material, such as beryllia powder, and then pressed and sintered to make a fuel element. The use of urania powders derived from sols provides a source of extremely small, very reactive uranous oxide particles which form compacts with close to theoretical density, which sinter at lower temperatures than conventional urania powders, and interact with other components at relatively low temperatures. It is also important to note that the urania sol of this invention forms a film on glass. This film was found to be $UO_2$. It is a very tough film and can be removed only by acid treatment. There are obviously applications where the preparation of such a film would be advantageous.

We have found that hydrothermally stable uranous oxide sols which are made up of aqueous dispersions of uranous oxide particles can be prepared by a process which comprises preparing a solution of uranyl chloride, reducing the uranyl chloride present to uranous oxychloride, and autoclaving the uranous oxychloride solution at the proper temperature for the proper period of time to complete the sol preparation. After the sol has been prepared, it is separately recovered using the conventional techniques. The uranous oxide sols of our invention contain larger, denser particles than the uranous oxide sols prepared previously.

The first step in the preparation of our sols is the preparation of uranous oxychloride solutions. This solution is prepared by separately dissolving uranyl chloride in the desired concentration in an aqueous medium. After the uranyl chloride solution is prepared in excess hydrochloric acid, it is reduced to prepare the uranous oxychloride. The reduction may be carried out at any concentration of uranyl chloride up to the limit of its solubility. This reduction can take place by any of several possible processes. A satisfactory process involves electrodialysis with partial removal of the chloride ions. The product can also be prepared by reduction of the uranyl chloride solution followed by precipitation of the uranous hydroxide, washing to remove electrolytes, and addition of sufficient hydrochloric acid to the washed uranous hydroxide to obtain the oxychloride.

After the uranous oxychloride solution is prepared, it is autoclaved and the product recovered. Suitable sols can be made when the equivalent uranous oxide concentration is between 0.1 and 20 g./100 ml. The preferred uranous oxide concentration is 5 g./100 ml. The autoclaving is carried out in an inert or reducing atmosphere at a temperature of 100 to 200° C. It is necessary to autoclave for periods of 2 to 40 hours, depending upon the temperature and uranous oxide concentration. Preferred autoclaving conditions are 20 hours at 150° C. at a uranous oxide concentration level of 5 g./100 ml.

After the uranous oxychloride solution has been autoclaved for the requisite period of time, the autoclave is cooled and the product recovered as a solid which disperses to a brown or black sol when the supernatant liquor is replaced by deionized water. The supernatant contains the bulk of the electrolytes and is readily removed by decanting, or centrifuging. After the supernatant liquor has been removed, the uranous oxide particles are easily redispersed in deionized water to form a stable sol containing up to 30 weight percent solids. This sol can be further deionized, if desired.

The sol particles are roughly spherical or cubic aggregates ranging up to 300 millimicrons in diameter. The subparticles are generally 5–10 millimicron granulated cubes. Where autoclaving conditions have been more extreme, the sol particles are dense, smooth granules which may be either round or oblong and which vary from 5–200 millimicrons in their longest dimension. Under very extreme autoclaving conditions, some hexagonal plates may also be formed.

As stated previously, the sol can also be prepared by autoclaving partially neutralized uranous hydroxide. This process involves the precipitation with ammonia of uranous chloride solution prepared by reduction of uranyl chloride solution. After the ammonia precipitation is complete, the hydroxide is washed free of electrolytes, then treated with from 1 to 3 moles of hydrochloric acid per mole of uranium. A nitrogen blanket is maintained in the preparation of all the uranous solutions and precipitates to retard oxidation. This method can be used to prepare the sols where the $UO_2$:chloride ratio at a concentration level of 5 grams of $UO_2$ per 100 ml. is kept between 0.25 and 1. The optimum ratio is 1. At $UO_2$:chloride ratios below 1, a less satisfactory material is recovered. Although the oxychloride is usually the most convenient starting material, other soluble non-oxidizing basic salts such as the oxybromide, oxyacetate, oxyformate, etc., give satisfactory results.

Example 1

A 120 ml. charge of uranous chloride solution obtained by the electrolytic reduction of the uranyl chloride solution in excess hydrochloric acid followed by electrodialysis to remove chloride ions was sealed into a glass pressure vessel under nitrogen. The solution contained the equivalent of 5 grams of $UO_2$ per 100 ml. The pressure vessel was heated for 20 hours at 150° C. The changes in pH and conductivity on autoclaving are shown below:

|  | Before Autoclaving | After Autoclaving |
|---|---|---|
| pH | 0.55 | 0.14 |
| Specific Conductance (mhos/cm.) | $1.2 \times 10^{-4}$ | $2.5 \times 10^{-4}$ |

The product obtained was a black floc which settled on standing. The bulk of the electrolytes were removed by decanting the liquid from the floc. The floc was then redispersed in deionized water to prepare a non-settling sol. Electromicrographs of the sol showed it to be composed of particles which were both spherical and cubic aggregates of 7 millimicron subparticles. The aggregates ranged in size from 15 to 200 millimicrons.

Example II

In this run, 120 ml. of a uranous oxychloride solution prepared in accordance with the method described in Example I were sealed in a glass pressure vessel under a nitrogen atmosphere and autoclaved for 20 hours at 120° C. The solution contained one gram of $UO_2$ per 100 ml. The pH and specific conductance values before and after autoclaving are shown below:

|  | Before Autoclaving | After Autoclaving |
|---|---|---|
| pH | 1.35 | 0.85 |
| Specific Conductance (mhos/cm.) | $2.2 \times 10^{-2}$ | $7.2 \times 10^{-2}$ |

The product was obtained as a brown solid from which a supernatant liquid containing most of the hydrochloric acid released during autoclaving was removed by decantation. The residue was dispersed in deionized water to give a gray-black sol. Electronmicrographs showed the sol to consist of granules averaging 10 to 20 millimicrons in diameter.

Example III

Three additional preparations were completed in which the glass pressure vessels were charged with 120 ml. of uranous oxychloride solution prepared in accordance with the method described in Example I.

A protective atmosphere of nitrogen was added before the vessels were sealed. The starting solution contained the equivalent of one gram of $UO_2$ per 100 ml. in each case. The materials were autoclaved by placing the glass vessels in an oven maintained at 150° C. In the first of these runs, the solution was autoclaved for 4 hours. During this period, the pH decreased from 1.35 to 0.89. The specific conductance increased from $2.2 \times 10^{-2}$ to $4.7 \times 10^{-2}$ mhos/cm.

The product was a blue-gray sol. The electronmicrograph showed it consisted of spherical particles ranging from 25 to 105 millimicrons in diameter. On closer examination of the electronmicrograph, the particles were seen to be aggregates of 7 to 10 millimicron subparticles. The subparticles were open-centered cubes. The particle formation appeared to begin by aggregation of the subparticles into round plates. The third dimension began to develop around the edge of the plate and gradually extended toward the center. Eventually the entire center of the particle was filled in by subparticles and a perfect spherical aggregate resulted.

Example IV

The second member of the group discussed in Example III was autoclaved for 8 hours at 150° C. Over this period the pH decreased from 1.37 to 0.77 and the specific conductance increased from $2.6 \times 10^{-2}$ to $7.6 \times 10^{-2}$ mhos/cm.

The brown solid product dispersed to a green-brown sol when the supernatant liquor was removed by decanting and was replaced with deionized water. The electronmicrographs showed the product to consist of colloidal particles which were smooth, round granules 7 to 10 millimicrons in diameter.

Example V

The third preparation described in Example III was autoclaved for 20 hours at 150° C. As before, the pH in the system changed. In this case, the pH decreased from 1.37 before autoclaving to 1.01 after autoclaving. The specific conductance increased from $2.6 \times 10^{-2}$ to $4.5 \times 10^{-2}$ mhos/cm.

The product was obtained as a brown solid which dispersed to a light brown sol when the supernatant liquor was removed by decantation and replaced by deionized water. Electronmicrographs of the product showed it to consist of colloidal particles which were smooth granules of 35 to 175 millimicrons in their largest dimension. The smaller granules were spherical while the larger ones were oblong in shape. Residual markings on the particles indicated their formation by a coalesence of smaller granules.

Example VI

Another preparation was completed using an oxychloride solution prepared in accordance with the method of Example I. The oxychloride solution contained the equivalent of 2 grams of uranium dioxide per 100 ml. The techniques of the preparation were essentially the same as those covered in the previous examples. The material was autoclaved as before in an oven maintained at 150° C. for a period of 20 hours. The pH decreased from 0.93 before autoclaving to 0.59 after autoclaving. The specific conductance increased from $6.1 \times 10^{-2}$ to $1.1 \times 10^{-2}$ mhos/cm.

A yellow-brown sol was obtained when the supernatant liquor was removed from the brown solid product by decantation and replaced with deionized water. The electronmicrographs showed the product to consist of colloidal particles which were smooth granules averaging 35 millimicrons in diameter. The residual markings on the particles indicated their formation by a coalesence of smaller granules. Some of the granules appeared to be transforming into hexagonal plates.

Example VII

In this run the amount of oxychloride produced in accordance with the method of Example I was increased from 2 grams of uranium dioxide per 100 ml. to 3 grams of uranium dioxide per 100 ml. The material was autoclaved as in the example above for a period of 20 hours at a temperature of 150° C. As in the previous runs, the pH decreased in this case from 0.78 to 0.39, and specific conductance increased from $8.3 \times 10^{-2}$ to $1.6 \times 10^{-1}$ mhos/cm.

The product was a brown solid which dispersed to a brown sol after the electrolyte was removed by decanting the supernatant liquor and replacing it with deionized water. The electronmicrograph showed the product was made up of colloidal particles which were spherical aggregates ranging from 10 to 65 millimicrons in diameter. The subparticles composing the aggregates were 7 to 10 millimicron granulated cubes.

Example VIII

The effect of variation in autoclaving, time and temperature was studied by a series of runs in which the oxychloride solution, prepared in accordance with the method described in Example I, was autoclaved in a concentration equivalent to 5 grams of $UO_2$ per 100 ml. In the first of these runs, the material was autoclaved for a period of 20 hours at a temperature of 120° C. The pH decreased in this run from 0.47 to 0.22 between the beginning and the end of the autoclaving period. The specific conductance increased in the same period from $1.3 \times 10^{-2}$ to $2.6 \times 10^{-2}$ mhos/cm. The gray-black solid recovered was easily dispersed to a greenish-gray sol by removal of the supernatant liquid by decantation and replacement with deionized water. This sol gave a strong Tyndall effect. The electronmicrograph showed the particles to be mostly cubic aggregates ranging from 25 to 250 millimicrons and averaging 65 millimicrons on the side. The aggregates were composed of subparticles which were 7 millimicron open-centered cubes.

*Example IX*

In the next four runs, glass pressure vessels were charged with 120 ml. of uranous oxychloride solution prepared according to the process of Example I. Each of these charges contained the equivalent of 5 grams of $UO_2$ per 100 ml. Each charge was protected by a nitrogen atmosphere prior to sealing. The vessels were then heated in an oven at 150° C. as described previously. In the first of these runs, the material was heated for 4 hours. The usual pH decrease was observed, and in this case the pH dropped from 0.47 to 0.40. The specific conductance increased from $1.3 \times 10^{-1}$ to $2.5 \times 10^{-1}$ mhos/cm.

The product was a brown solid which dispersed to a black sol when the supernatant liquor was removed by decantation and replaced by deionized water. Electronmicrographs showed the colloidal particles to be spherical aggregates averaging 35 millimicrons in diameter and consisting of 7 millimicron open-centered cubic particles. The subparticle packing in this run was obviously quite loose. In some areas the spheres were not completely filled out.

*Example X*

In the second of these runs, the pressure vessel was heated for a period of eight hours. During autoclaving the pH decreased from 0.47 to 0.12 and the specific conductance increased from $1.3 \times 10^{-1}$ to $2.1 \times 10^{-1}$ mhos/cm.

The gray-black solid product dispersed to a black sol when the supernatant liquor was removed by decantation and was replaced with deionized water. Electronmicrographs showed the colloidal particles to be a mixture of cubic and spherical aggregates in the size range from 15 to 300 millimicrons. The larger particles were tightly packed cubes whereas the smaller particles were predominantly spherical and generally less dense than the cubic aggregates. The constituent subparticles were granulated cubes about 7 millimicrons on an edge with a vestige of a hole in the center.

*Example XI*

In the third run of this series, the pressure vessel was heated for a period of 20 hours. The pH change was more marked, in this case decreasing from 0.47 to 0.09 as a result of the autoclaving. The specific conductance increased from $1.3 \times 10^{-1}$ to $2.3 \times 10^{-1}$ mhos/cm. The product was obtained as a brown solid which on dispersion gave a greenish-brown sol when the supernatant liquor was removed by decantation and replaced with deionized water. The electronmicrograph showed the particles to be mostly cubic aggregates ranging from 25 to 250 millimicrons. The subparticles were the 7 millimicron cubes described above. The aggregates, both large and small, were uniformly filled out and tightly packed.

*Example XII*

In the last run of this series, the pressure vessel was heated for 32 hours. During the autoclaving the pH decreased from 0.47 to 0.19 and the specific conductance increased from $1.38 \times 10^{-1}$ to $2.5 \times 10^{-1}$ mhos/cm. A black sol was obtained when the black solid product was redispersed after the supernatant liquor was removed by decantation and replaced with deionized water. Electronmicrographs showed the colloidal particles to be mostly thin plates 25 to 250 millimicrons across with sharp square corners. Some of these plates appeared to be in the process of forming cubic aggregate particles of the type described in the product of Example XI.

A review of the data presented in the examples above show the effect of autoclaving conditions. Autoclaving at 20 hours at 150° C. appeared to be the optimum conditions for making dense sol particles. Autoclaving for 20 hours at 120° C. gave good particles but did not complete hydrolysis as evidenced by a green supernatant above the brown uranous oxide floc.

The data presented in Examples II–XII show that when the basic uranous chloride solution was diluted from 5 grams of $UO_2$ per 100 ml. to 1 or 2 grams per 100 ml. autoclaving yielded smooth granules rather than aggregates. The aggregate type particle obviously has a transistory existence at these lower $UO_2$ concentrations. The product of Example IV, for instance, which contained 1 gram of $UO_2$ per 100 ml. was a mixture of flat plates after 4 hours autoclaving at 150° C. These plates were built up around the edges into spheres all of which were aggregates of 7 millimicron subparticles. After 4 hours additional autoclaving at 150° C. the system was transformed to smooth dense 7 to 10 millimicron granules. Such granules are known to be the result of prolonged hydrothermal treatment of individual $UO_2$ subparticles. The granules grow by coalescence on continuous autoclaving.

At a concentration level of 3 to 5 grams of $UO_2$ per 100 ml. particles are initially formed by loose aggregation of sub-particles. As autoclaving time is increased, both aggregates and constituent subparticles grow. Both the subparticles and the aggregates become more sharply cubic. Aggregate density is best after about 20 hours at 150° C. Any further autoclaving gradually transforms three-dimensional subunits into thin plates with sharp square corners and leads to eventual disruption of the aggregate as shown in Example XII.

*Example XIII*

The effect of $UO_2$:Cl ratio on the particle characteristics of the product sol was investigated through a series of runs in which the uranous oxide concentration was 5 g./100 ml. The uranous oxychloride solution was obtained by precipitating a uranous chloride solution with ammonia. The solution was prepared by electrolytic reduction of aqueous uranyl chloride containing excess hydrochloric acid, washing the resulting uranous hydroxide until free of chloride ions, followed by dissolving the precipitate in sufficient hydrochloric acid solution to give the desired $UO_2$:Cl ratio. The solution was then diluted to a final concentration of 5 grams of uranous oxide per 100 ml. All of the foregoing operations were carried out in a nitrogen atmosphere to retard oxidation.

In the first run of the series, the $UO_2$/Cl ratio was adjusted to 0.25 by dissolving the washed uranous hydroxide containing the equivalent of 6.0 grams of uranous oxide in 29.6 ml. of 3 M hydrochloric acid. The solution was diluted to 120 ml., then transferred to a glass pressure vessel and sealed under a protective atmosphere of nitrogen. The pressure vessel was placed in an oven set at 150° C. for 24 hours. During autoclaving pH decreased from 0.99 to 0.38 and specific conductance increased from $7.5 \times 10^{-2}$ to $1.8 \times 10^{-1}$ mhos/cm.

The product was obtained as a brown solid which dispersed to a black sol when the supernatant liquor was removed by decantation and replaced with deionized water. Electronmicrographs showed the sol particles to be 7–10 millimicron granules with a strong tendency to associate.

*Example XIV*

In the second run of this series, the $UO_2$/Cl ratio was increased to 0.5. As in Example XIII, uranous hydroxide was prepared by ammonia precipitation of uranous chloride solution and washed until free of chloride ions. In this case, however, the precipitate was dissolved by adding 14.8 ml. of 3 M hydrochloric acid prior to dilution to 120 ml. After dilution to 120 ml., the solution which now contained 5 grams uranous oxide per 100 ml. was sealed into a pressure vessel under nitrogen and autoclaved for 24 hours at 150° C. The pH before autoclaving was 1.38 and decreased during autoclaving to 0.62. The specific conductance increased from $4.0 \times 10^{-2}$ to $8.8 \times 10^{-2}$ mhos/cm.

A brown sol which scattered light very strongly was obtained by dispersing the brown solid formed during autoclaving after the supernatant liquor was removed by decantation and replaced with deionized water. The sol particles were shown by electronmicroscopy to be mostly plates—squares, parallelograms, and hexagons— in contrast to the 7–10 millimicron granules occurring at a $UO_2Cl$ ratio of 0.25.

*Example XV*

The $UO_2/Cl$ ratio was increased to 0.75 in the third run of the series. This was done by dissolving the washed uranous hydroxide precipitate in 9.9 ml. of 3 M hydrochloric acid. As in the previous two examples, the uranous oxide concentration was 5 grams per 100 ml. after dilution of the solution to 120 ml. The solution was then sealed into a pressure vessel under nitrogen and autoclaved 24 hours at 150° C. as in Examples XIII and XIV. As in the previous runs, the pH and specific conductance changed during autoclaving although to a lesser degree; the pH decreased from 1.30 to 0.78 and specific conductance increased from $3.0 \times 10^{-2}$ to $7.3 \times 10^{-2}$ mhos/cm.

The product was a brown solid which dispersed to a brown sol when the supernatant liquor was removed by decantation and replaced with deionized water. Electronmicrographs showed the dispersed phase to be a mixture of plates and granules interspersed with some extremely small-sized material. The granules were both spherical and cubic, and averaged 35–40 millimicrons in diameter.

*Example XVI*

In the last run of the series, the $UO_2/Cl$ ratio was adjusted to 1.0. The washed uranous hydroxide, prepared according to the technique described in Example XIII, was dissolved in 7.4 ml. of 3 M hydrochloric acid. The solution contained 5 grams of uranous oxide per 100 ml. after dilution to 120 ml. It was sealed into a glass pressure vessel under a protective atmosphere of nitrogen and autoclaved 24 hours at 150° C. During autoclaving, the pH decreased from 1.49 to 0.96 and the specific conductance increased from $2.2 \times 10^{-2}$ to $5.0 \times 10^{-2}$ mhos/cm.

A brown sol was obtained by decanting the supernatant liquor from the brown solid product and dispersing in deionized water. The particles of which the sol was composed were shown by electronmicrographs to be mostly spherical and cubic granules averaging 35–40 millimicrons in diameter. There were still a few plates, but they constituted a much smaller fraction of the total number of particles than in the product described in Example XV.

*Example XVII*

Two runs were completed at increased uranous oxide concentrations. In the present example, uranous oxychloride solution was autoclaved 24 hours at 150° C. at a concentration level of 10 grams of uranous oxide per 100 ml. The solution was prepared by the method of Example XIV to have a $UO_2/Cl$ ratio of 0.5. The uranous hydroxide precipitate was obtained by precipitating 240 ml. of uranous chloride solution with ammonia. The solution was prepared by electrolytic reduction of uranyl chloride and contains 5 grams of uranous oxide per 100 ml. The precipitate was washed to remove chloride ions, then treated with 29.6 ml. of hydrochloric acid. The resulting solution was diluted to 120 ml. and sealed into a pressure vessel under nitrogen. The pH and specific conductance changed during autoclaving although not as much in proportion to the increased urania content as one might expect from earlier results with systems containing only 5 grams of uranous oxide per 100 ml. The pH decreased from 1.09 to 0.32 and specific conductance increased from $6.5 \times 10^{-2}$ to $2.1 \times 10^{-1}$ mhos/cm.

The product was obtained as a black solid which dispersed to a blue-brown sol when the supernatant liquor was removed by decantation and was replaced with deionized water. The particles composing the sol, as seen from electronmicrographs, were mostly randomly associated 7 millimicron granulated cubes with a few tight aggregates ranging up to 13 millimicrons in diameter. These particles contrast sharply with the plates obtained in Example XIV when the sol was prepared at a concentration of 5 grams of uranous oxide per 100 ml.

*Example XVIII*

In this case, uranous oxide concentration was increased to 15 grams per 100 ml. The oxychloride solution was prepared as in the preceding example except that 360 ml. of the uranous chloride solution were precipitated and 10.9 ml. of concentrated hydrochloric acid were used to obtain the $UO_2/Cl$ ratio of 0.5. After dilution to 120 ml., the oxychloride solution was sealed into a glass pressure vessel under nitrogen and autoclaved 24 hours at 150° C. During this time, the pH dropped from 1.12 to 0.24 and specific conductance rose from $5.8 \times 10^{-2}$ to $1.7 \times 10^{-1}$ mhos/cm. These were still smaller proportional changes than those seen in Example XVII.

After the pressure vessel had been cooled and the supernatant liquor removed by decantation, a black sol was obtained by dispersing the gray-black solid formed during autoclaving in deionized water. Electronmicrographs showed the dispersed phase to consist entirely of granulated 7 millimicron cubes.

Examples XIII through XVIII illustrate production of uranous oxide sol by autoclaving uranous oxychloride prepared by an alternate method. This alternate method, by which uranous hydroxide is dissolved in a predetermined amount of hydrochloric acid, permits close control of the $UO_2/Cl$ ratio. By systematically varying this ratio, its effect upon sol particle characteristics was studied. A $UO_2/Cl$ ratio of 1 was found to be optimum at an uranous oxide concentration of 5 grams per 100 ml. and after autoclaving 24 hours at 150° C.

The effect of increasing oxychloride concentration during autoclaving was investigated in Examples XVII and XVIII. Satisfactory product sols were obtained at both the 10 gram and 15 gram uranous oxide per 100 ml. levels. The constituent particles were small granules rather than the plates produced under similar autoclaving conditions at the 5 gram per 100 ml. concentrations.

Obviously many modifications and variations of the invention, as hereinabove set forth, may be made without departing from the essence and scope thereof, and only such limitations should be applied, as indicated in the appended claims.

What is claimed is:

1. A process for preparing stable uranous oxide sols made up of aqueous dispersions of uranous oxide particles in the size range of 10 to 300 millimicrons which comprises preparing a solution of a non-oxidizing uranyl salt selected from the group consisting of the oxybromide, the oxychloride, the oxyacetate and the oxyformate, electrodialyzing to convert the non-oxidizing uranyl salt, autoclaving the uranous oxysalt solution at a temperature of about 100 to 200° C. for a period of time sufficient to complete sol particle preparation, redispersing in deionized water and recovering uranous oxide sol as the final product.

2. A process for preparing stable uranous oxide sol made up of aqueous dispersions of uranous oxide particles in the size range of 10 to 300 millimicrons which comprises preparing an uranyl chloride solution containing about 0.1 to 200 grams of uranyl chloride per liter, electrodializing the uranyl chloride solution to reduce the uranium present and remove a portion of the chloride ions thereby converting the solution to one of uranous oxychloride, autoclaving the oxychloride solution at a temperature of about 100 to 200° C. for about 2 to 40 hours, collecting the uranous oxide particles, redispersing in deionized water and recovering uranous oxide sol as the final product.

3. A process for preparing a stable sol of uranous oxide composed of a dispersion of particles in the 10 to 300 millimicron size range which comprises preparing an uranyl chloride solution to contain about 0.1 to 200 grams of uranous oxide per liter, reducing the uranyl chloride to uranous chloride, adding a basic precipitant, recovering the hydroxide formed, washing to remove chloride ions, converting to the uranous oxychloride by the addition of hydrochloric acid, autoclaving the uranous oxychloride solution at a temperature of 100 to 200° C. for about 2 to 40 hours, recovering the sol particles, redispersing said particles in deionized water and recovering uranous oxide sol as the final product.

4. A process for preparing stable uranous oxide sols composed of particles in the 10 to 300 millimicron size range which comprises preparing an uranyl chloride solution in excess hydrochloric acid to contain about 0.1 to 200 grams of uranous oxide per liter, electrodializing the uranyl chloride solution at a temperature of about 1 to 100° C., recovering the uranous oxychloride solution thus formed, autoclaving the uranous oxychloride solution at a temperature of about 100 to 200° C. for about 2 to 40 hours, cooling, decanting the supernatant liquid, redispersing the uranous oxide particles in deionized water, and recovering uranous oxide sol as the final product.

References Cited by the Examiner

UNITED STATES PATENTS

| | | | |
|---|---|---|---|
| 2,885,366 | 5/59 | Iler et al. | 252—313 |
| 2,905,528 | 9/59 | Johnson et al. | 23—14.5 |
| 3,024,199 | 3/62 | Pasfield | 252—313 |
| 3,091,592 | 5/63 | Fitch et al. | 252—301.1 |
| 3,097,175 | 7/63 | Barrett et al. | 252—301.1 |

FOREIGN PATENTS 591,014   1/60   Canada.

OTHER REFERENCES

Weiser: "Inorganic Colloid Chemistry," vol. II, pp. 321, 322 (1935).

Katz et al.: "The Chemistry of Uranium," pp. 293, 294, 587, 597 (1951).

CARL D. QUARFORTH, *Primary Examiner*.